United States Patent
Nagayama et al.

(10) Patent No.: US 10,437,229 B2
(45) Date of Patent: Oct. 8, 2019

(54) NUMERICAL CONTROLLER (71) Applicant: FANUC CORPORATION, Minamitsuru-gun, Yamanashi (JP)

(72) Inventors: Susumu Nagayama, Yamanashi (JP); Akira Egashira, Yamanashi (JP); Hideaki Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 13 days.

(21) Appl. No.: 15/366,214

(22) Filed: Dec. 1, 2016

(65) Prior Publication Data
US 2017/0160716 A1    Jun. 8, 2017

(30) Foreign Application Priority Data
Dec. 3, 2015   (JP) ................. 2015-236283

(51) Int. Cl.
*G05B 19/4068*  (2006.01)
*G05B 19/4093*  (2006.01)
(Continued)

(52) U.S. Cl.
CPC ......... *G05B 19/4068* (2013.01); *G05B 19/29* (2013.01); *G05B 19/402* (2013.01);
(Continued)

(58) Field of Classification Search
CPC ... A61B 34/10; A61B 34/25; A61B 2034/107; A61B 90/36; A61B 90/37; G06F 19/00;
(Continued)

(56) References Cited

U.S. PATENT DOCUMENTS 6,107,768 A *   8/2000  Ouchi ................ G05B 19/4068
                                                   318/568.1
6,970,764 B2 * 11/2005  Harada .............. G05B 19/4093
                                                   318/568.1
(Continued)

FOREIGN PATENT DOCUMENTS

DE          4039506 A1     6/1991
DE     112014006829 T5     4/2017
(Continued)

OTHER PUBLICATIONS

Notification of Reasons for Refusal for Japanese Application No. 2015-236283, dated Dec. 19, 2017 with translation, 6 pages.
(Continued)

*Primary Examiner* — Crystal J Barnes-Bullock
(74) *Attorney, Agent, or Firm* — RatnerPrestia (57) ABSTRACT

A numerical controller includes a machining program creation unit for receiving an input of a machining program including a cycle command, a tool path creation unit for creating a plurality of tool paths based on the machining program, a display unit for displaying the machining program and the plurality of tool paths, and a correspondence relation management unit for recording a relation between an argument of the cycle command and the plurality of tool paths in an information table, wherein the correspondence relation management unit receives a selection of a selected tool path corresponding to one of the plurality of tool paths, and specifies an argument of the cycle command corresponding to the selected tool path with reference to the information table, and the display unit displays the specified argument in a different form from a form of another argument in the machining program.

3 Claims, 11 Drawing Sheets

(51) Int. Cl.
*G05B 19/4097* (2006.01)
*G05B 19/29* (2006.01)
*G05B 19/402* (2006.01)
*G05B 19/4069* (2006.01)

(52) U.S. Cl.
CPC ..... *G05B 19/4069* (2013.01); *G05B 19/4097* (2013.01); *G05B 19/40937* (2013.01); *G05B 2219/35167* (2013.01); *G05B 2219/35287* (2013.01); *G05B 2219/35321* (2013.01); *G05B 2219/35336* (2013.01); *G05B 2219/36342* (2013.01)

(58) Field of Classification Search
CPC ............ G05B 19/4068; G05B 19/4069; G05B 19/4093; G05B 19/40937; G05B 19/4097; G05B 2219/35168; G05B 2219/35219; G05B 2219/35287; G05B 2219/35506; G05B 2219/35167; G05B 2219/35522; G05B 2219/36284
See application file for complete search history.

(56) References Cited

U.S. PATENT DOCUMENTS

| | | | | |
|---|---|---|---|---|
| 7,269,471 B2* | 9/2007 | Kadono | ............ | G05B 19/4097 345/419 |
| 8,175,861 B2* | 5/2012 | Huang | ............... | G05B 19/4068 700/159 |
| 8,560,113 B2* | 10/2013 | Diehl | ............... | G05B 19/40937 345/420 |
| 9,342,065 B2* | 5/2016 | Nonaka | ............. | G05B 19/4069 |
| 9,494,930 B2* | 11/2016 | Mitani | ............... | G05B 19/4097 |
| 9,703,281 B2* | 7/2017 | Shamoto | ............. | G05B 19/404 |
| 10,088,832 B2* | 10/2018 | Tanigawa | ........... | G05B 19/4097 |
| 10,108,178 B2* | 10/2018 | Yasukochi | ......... | G05B 19/4069 |
| 2013/0338809 A1 | 12/2013 | Kume | | |
| 2015/0066191 A1* | 3/2015 | Yasukochi | ......... | G05B 19/4069 700/160 |
| 2016/0124981 A1* | 5/2016 | Jiang | ................. | G05B 19/4093 707/821 |
| 2016/0224015 A1* | 8/2016 | Tanigawa | ........... | G05B 19/4097 |
| 2016/0320772 A1* | 11/2016 | Ono | ................ | G05B 19/40938 |
| 2017/0160725 A1* | 6/2017 | Kikata | ............... | G05B 19/4068 |
| 2017/0300035 A1* | 10/2017 | Kawai | ................ | G05B 19/4068 |
| 2017/0308055 A1* | 10/2017 | Hoshino | .............. | G05B 19/409 |
| 2018/0210420 A1 | 7/2018 | Kaneko et al. | | |

FOREIGN PATENT DOCUMENTS

| | | |
|---|---|---|
| JP | S 61-170807 A | 8/1986 |
| JP | H 06-202906 A | 7/1994 |
| JP | 2000039909 A | 2/2000 |
| JP | 2002126975 A | 5/2002 |
| JP | 2014016982 A | 1/2014 |

OTHER PUBLICATIONS

German Examination Report for German Application No. 10 2016 014 382.7, dated Jul. 26, 2019 with translation, 11 pages.

* cited by examiner

NUMERICAL CONTROLLER

BACKGROUND OF THE INVENTION

1. Field of the Invention

The present invention relates to a numerical controller, and particularly relates to a numerical controller that allows a relation between an argument of a cycle command and a tool path to be displayed.

2. Description of the Related Art

A numerical controller that controls a machine tool according to an input machining program has been widely known. In the machining program, a linear or arc motion, etc. can be implemented using Gxx (x is a numerical value) code of EIA/ISO code. For example, when a description of G00 X1. Y1., etc.

is performed in the machining program, it is possible to output a command to move a tool to coordinates x1, y1, etc.

In addition, recently, a cycle command capable of allowing a tool to perform a complex operation has been implemented.

For example, a description of

Gxxxx (x is a numerical value) P1 Q2.45 H100 . . . , etc.

is performed in a machining program to output the cycle command. Herein, movement of the tool is determined by a value of an argument designated after Gxxxx.

The numerical controller has a function of simulating movement of the tool by the input machining program, and displaying a result thereof, that is, a tool path on a screen. At the time of creating a machining program, a user performs an operation of correcting the machining program, etc. to obtain desired tool movement while comparing the machining program with a simulation result.

Incidentally, in a complex command such as the cycle command, it is difficult to immediately identify an argument to be changed in order to be able to change a tool path as desired only by viewing a machining program. Therefore, the user has determined an argument to be changed to obtain a desired result with reference to a manual, and performed an operation of correcting the argument.

Conventional arts related to this point include JP 61-170807 A and JP 6-202906 A. JP 61-170807 A describes that a tool path is drawn by simulating a machining program created using EIA/ISO code, a portion of the drawn tool path is selected, and a part of the machining program corresponding to the selected tool path is allowed to be corrected.

JP 6-202906 A describes that a tool path corresponding to a portion at which a cursor is positioned is drawn in a different color to a color of another path in a machining program which is being edited.

However, in the arts described in JP 61-170807 A and JP 6-202906 A, a relation between a selected tool path and an argument of a cycle command cannot be known when a machining program corresponds to the cycle command. Therefore, there has been a problem that it is impossible to identify an argument of the cycle command to be changed in order to be able to change a tool path as desired.

SUMMARY OF THE INVENTION

The invention has been conceived to solve the above-mentioned problem, and an object of the invention is to provide a numerical controller that allows a relation between an argument of a cycle command and a tool path to be displayed.

A numerical controller according to an embodiment of the invention is a numerical controller including a machining program creation unit for receiving an input of a machining program including a cycle command, a tool path creation unit for creating a plurality of tool paths based on the machining program, and a display unit for displaying the machining program and the plurality of tool paths, wherein the numerical controller further includes a correspondence relation management unit for recording a relation between an argument of the cycle command and the plurality of tool paths in an information table, the correspondence relation management unit receives a selection of a selected tool path corresponding to one of the plurality of tool paths, and specifies an argument of the cycle command corresponding to the selected tool path with reference to the information table, and the display unit displays the specified argument in a different form from a form of another argument in the machining program.

A numerical controller according to another embodiment is characterized in that the correspondence relation management unit specifies all tool paths corresponding to the specified argument with reference to the information table, and the display unit displays the specified tool paths among the plurality of tool paths in a different form from a form of another tool path.

A numerical controller according to another embodiment is a numerical controller including a machining program creation unit for receiving an input of a machining program including a cycle command, a tool path creation unit for creating a plurality of tool paths based on the machining program, and a display unit for displaying the machining program and the plurality of tool paths, wherein the numerical controller further includes a correspondence relation management unit for recording a relation between an argument of the cycle command and the plurality of tool paths in an information table, the correspondence relation management unit receives a selection of one argument of the cycle command, and specifies all tool paths corresponding to the selected argument with reference to the information table, and the display unit displays the specified tool paths among the plurality of tool paths in a different form from a form of another tool path.

According to the invention, it is possible to provide a numerical controller that allows a relation between an argument of a cycle command and a tool path to be displayed.

BRIEF DESCRIPTION OF THE DRAWINGS

The above-described object and characteristic of the invention and other objects and characteristics will be clear from description of examples below with reference to accompanying drawings. In the drawings.

DETAILED DESCRIPTION OF THE PREFERRED EMBODIMENTS

Hereinafter, an embodiment of the invention will be described along with drawings.

Figure 10:
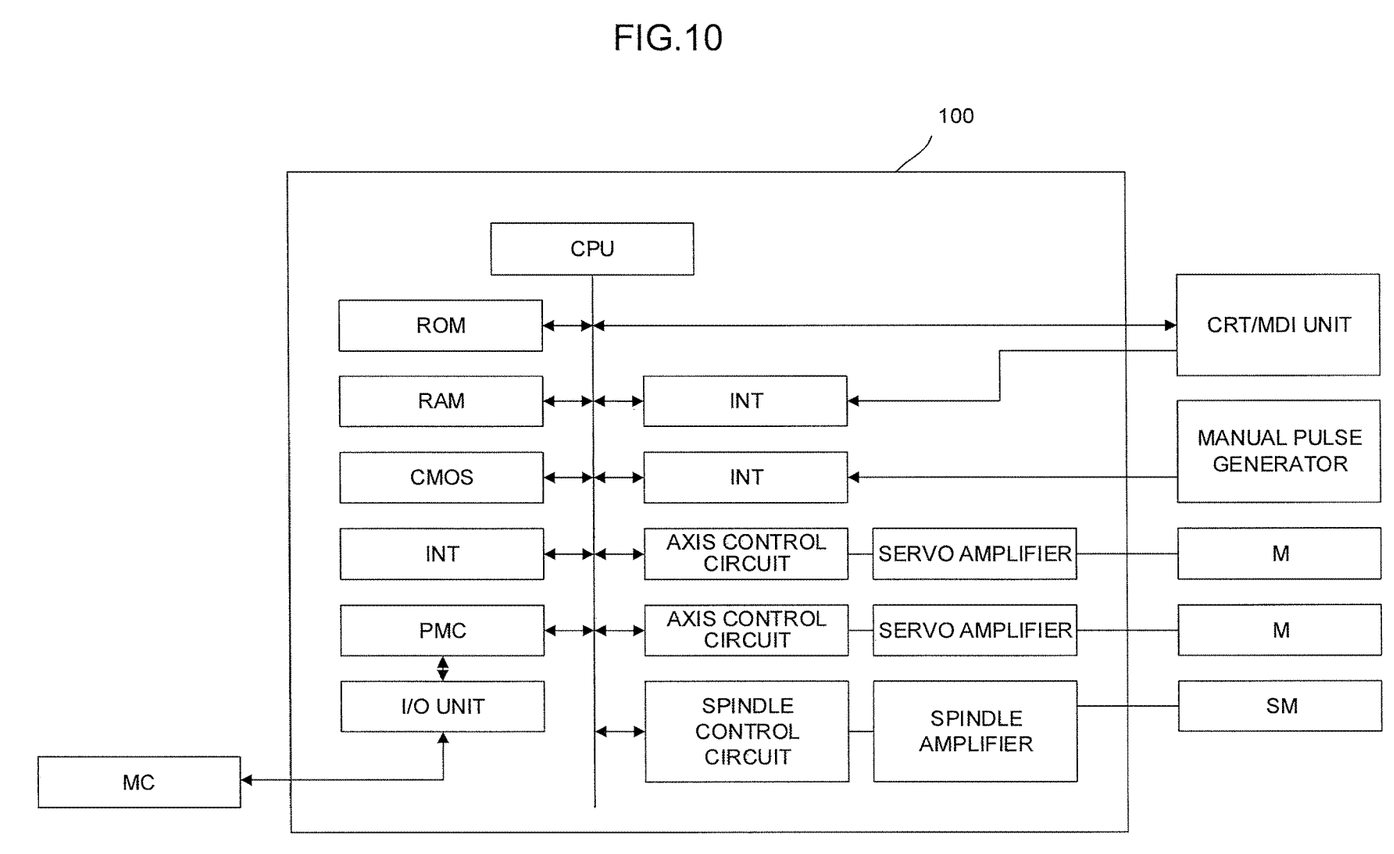
FIG. 10 is a block diagram illustrating a configuration of a numerical controller 100 according to an embodiment of the invention.
Figure 11:
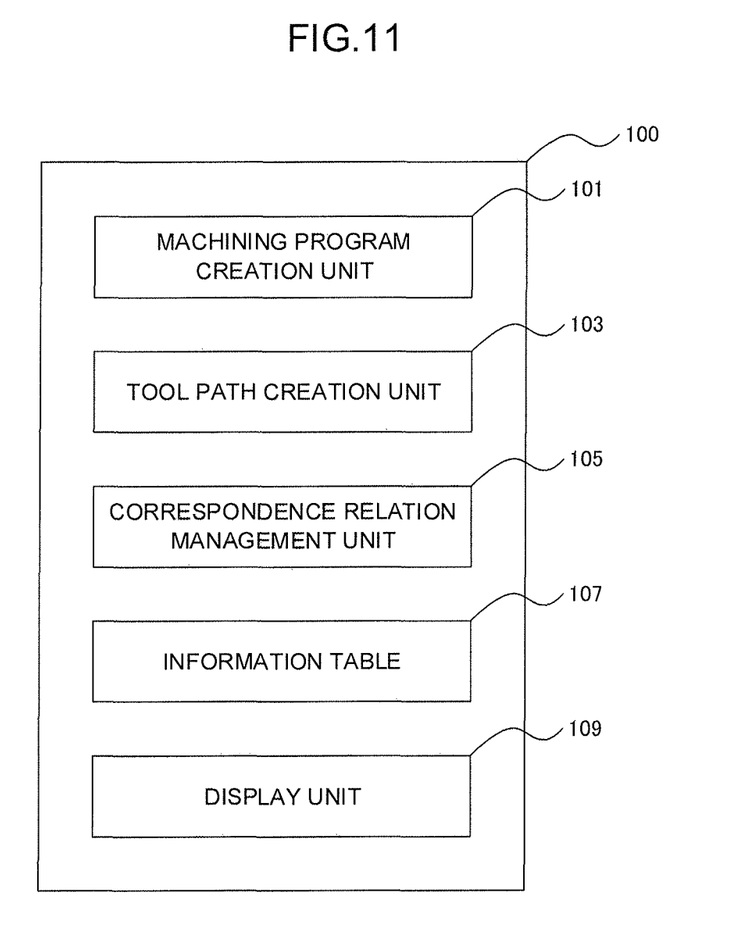
FIG. 11 is a block diagram illustrating a configuration of the numerical controller 100 according to the embodiment of the invention.

FIG. 10 is a block diagram illustrating a typical hardware configuration of a numerical controller 100 according to the embodiment of the invention. In addition, FIG. 11 is a block diagram illustrating a functional composition of the numerical controller 100. In the numerical controller 100, function units illustrated in FIG. 11 are logically implemented when a CPU illustrated in FIG. 10 executes a predetermined process according to a program.

As illustrated in FIG. 11, the numerical controller 100 includes a machining program creation unit 101, a tool path creation unit 103, a correspondence relation management unit 105, an information table 107, and a display unit 109.

Figure 2:
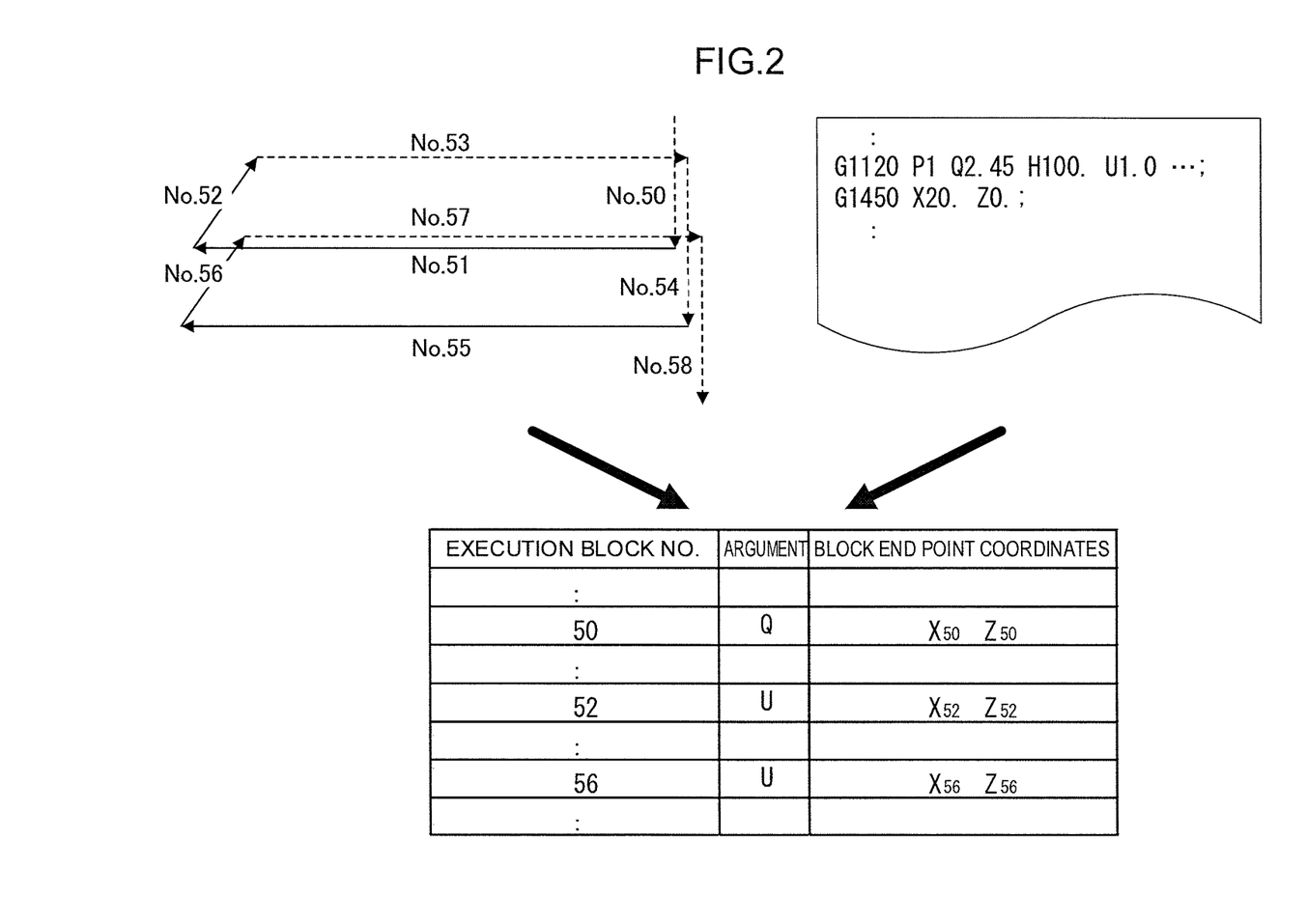
FIG. 2 is a diagram illustrating a process of creating an information table 107.

The machining program creation unit 101 provides a function of inputting and editing a machining program in the numerical controller 100. An example of the machining program is illustrated in FIG. 2 (upper right).

The tool path creation unit 103 performs a process of creating a tool path by simulating an operation of a tool based on the machining program created by the machining program creation unit 101, and allowing the display unit 109 to draw the tool path. An example of the tool path is illustrated in FIG. 2 (upper left).

The correspondence relation management unit 105 performs a process of recording a correspondence relation between an argument of a cycle command inside the machining program created by the machining program creation unit 101 and the tool path created by the tool path creation unit 103 in the information table 107. In addition, the correspondence relation management unit 105 performs a process of receiving a tool path selection, and specifying an argument of a cycle command corresponding to a tool path selected with reference to the information table. Alternatively, the correspondence relation management unit 105 performs a process of receiving an argument selection, and specifying all tool paths corresponding to an argument selected with reference to the information table.

Stored in the information table 107 is the correspondence relation between the argument of the cycle command inside the machining program created by the machining program creation unit 101 and the tool path created by the tool path creation unit 103. An example of the information table 107 is illustrated in FIG. 2 (bottom).

The display unit 109 draws the machining program or the tool path on a display device on an instruction of the machining program creation unit 101 or the tool path creation unit 103. In addition, the display unit 109 displays the argument of the cycle command or the tool path specified by the correspondence relation management unit 105 in a different form from another one.

EXAMPLE 1

When a portion of a drawn tool path is selected by a cursor, a numerical controller 100 according to Example 1 displays an argument of a cycle command related to the tool path in a different form from that of another argument. In addition, when a tool path other than the selected tool path is related to the argument, the tool path is displayed in a different form from that of another tool path.

Figure 4:
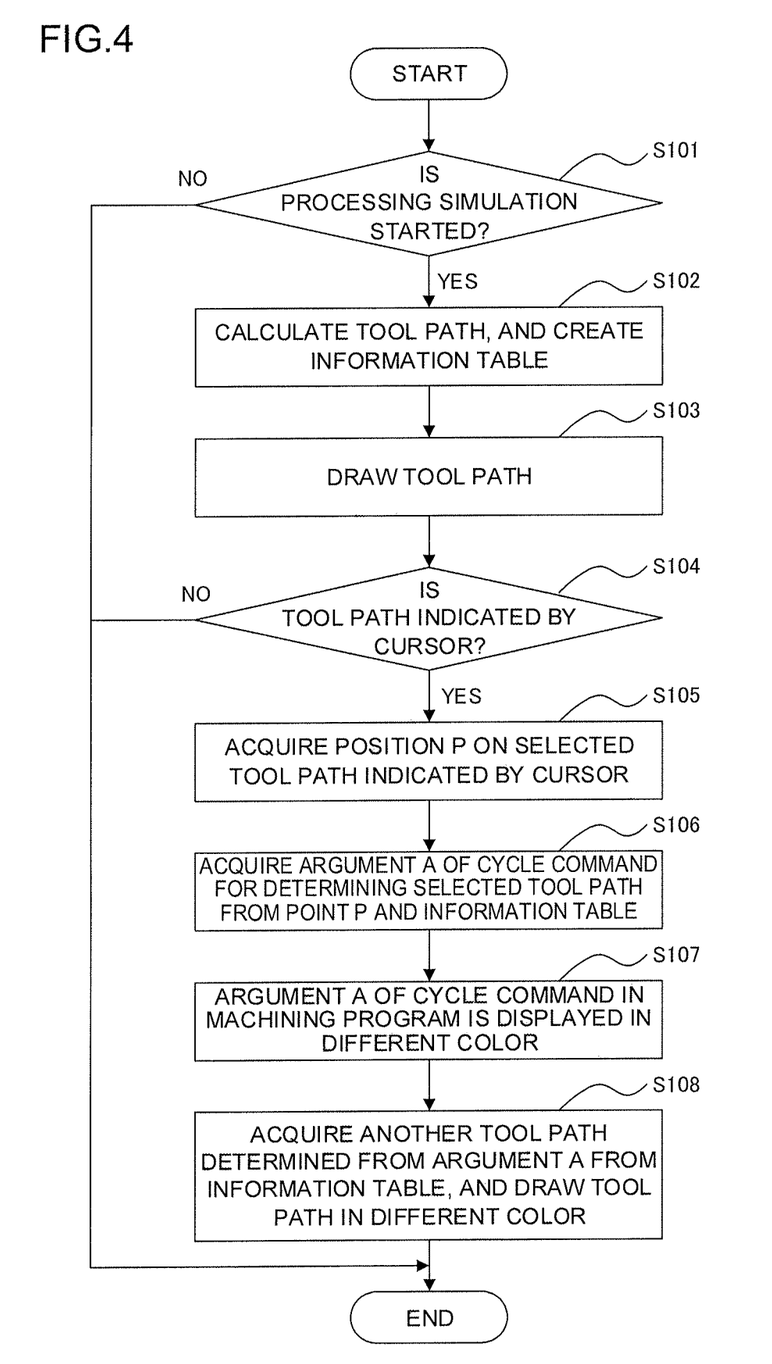
FIG. 4 is a flowchart illustrating an operation of a numerical controller 100 according to Example 1.

A description will be given of an operation of the numerical controller 100 according to Example 1 with reference to a flowchart of FIG. 4.

S101:

The machining program creation unit 101 receives an input of a machining program. Execution of a processing simulation is started.

S102:

The tool path creation unit 103 reads the machining program created by the machining program creation unit 101, and calculates a tool path. The tool path creation unit 103 determines end point coordinates of each tool path based on an argument of a cycle command. A process of calculating the tool path is known, and thus a detailed description thereof is omitted here.

The correspondence relation management unit 105 associates the end point coordinates of the tool path, the argument of the cycle command used to determine the end point coordinates, and an execution block No. with one another, and records the point coordinates, the argument, and the execution block No. in the information table 107. Herein, the execution block No. refers to a unique number for individually identifying a plurality of tool paths when a series of tool paths are configured by a combination of the plurality of tool paths (see FIG. 2). A process of creating the information table 107 will be described again below using FIG. 5.

S103:

The tool path creation unit 103 allows the display unit 109 to draw the tool path calculated in S102.

S104:

When the tool path creation unit 103 detects that an operation for selecting one tool path included in the tool paths drawn in S103 has been performed on the screen, the operation proceeds to S105. Typically, the tool path creation unit 103 detects that the user has indicated a position P on the screen by operating a pointer displayed on the screen.

S105:

The tool path creation unit 103 acquires coordinates in a graphic coordinate system of the position P on the screen indicated by the user in S104. The tool path creation unit 103 transforms the coordinates in the graphic coordinate system of the position P into coordinates in a workpiece coordinate system. In this way, a positional relation between the tool path and the position P indicated by the user on the screen can be evaluated. A process of transforming the coordinates will be described again below using FIG. 6.

S106:

The correspondence relation management unit 105 specifies a tool path corresponding to the position P as a selected tool path with reference to the information table 107. Typically, a distance D between the coordinates of the position P and each of the tool paths stored in the information table 107 is calculated, and the tool path can be specified as a selected tool path when the distance D is less than or equal to a predetermined allowable value. In addition, the correspondence relation management unit 105 specifies an argument A of a cycle command used to determine the selected tool path based on the information table 107. A process of specifying the argument will be described again below using FIG. 7 and FIG. 3.

S107:

The machining program creation unit 101 configures the argument A specified in S106 in a different display form from that of another argument, and allows the display unit 109 to display the machining program. Typically, the argument A can be displayed in a different color, size, thickness, font, etc. from that of another one.

Figure 1:
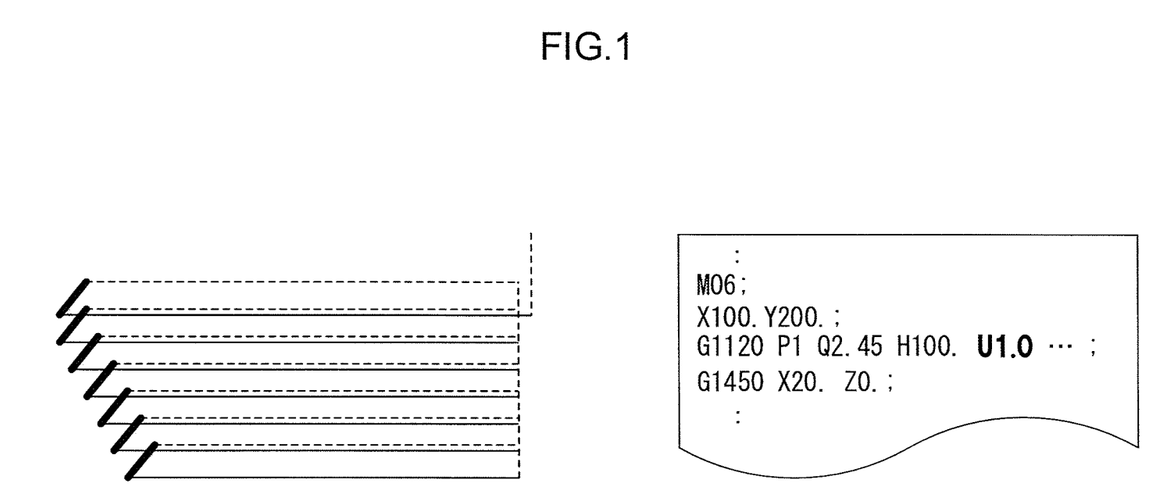
FIG. 1 is a diagram illustrating a display example of a tool path and an argument of a machining program in a numerical controller 100.

A display example is illustrated in FIG. 1 (right). In this example, a command that starts from "G1120" displayed with a grey background is a cycle command. Herein, "U1.0" corresponding to the argument A is displayed in bold type unlike another character.

S108:

Further, the correspondence relation management unit 105 extracts all tool paths related to the argument A with reference to the information table 107. That is, all records including the argument A specified in S106 are selected from the information table 107.

The tool path creation unit 103 allows the display unit 109 to display a tool path extracted herein in a different display form from that of another tool path. Typically, the selected tool path and the tool path extracted in S108 can be displayed in a different color, thickness, etc. from that of another one.

A display example is illustrated in FIG. 1 (left). In this example, herein, the selected tool path and the tool path extracted in S108 are displayed in thick lines unlike another tool path. This display process will be described again below using FIG. 8.

Next, the process of creating the information table 107 of S102 will be described in more detail using FIG. 5.

S201:

The tool path creation unit 103 reads the machining program created by the machining program creation unit 101, and analyzes syntax.

S202:

The operation proceeds to S203 when the cycle command is found to be included in the machining program as a result of analysis. On the other hand, the process ends when the cycle command is not present. For example, the cycle command that starts with "G1120" is included in the machining program illustrated in FIG. 5.

S203:

The tool path creation unit 103 creates a series of tool paths based on the cycle command using a known scheme. In this process, the tool path creation unit 103 determines end point coordinates of each of the tool paths based on the argument of the cycle command.

Figure 5:
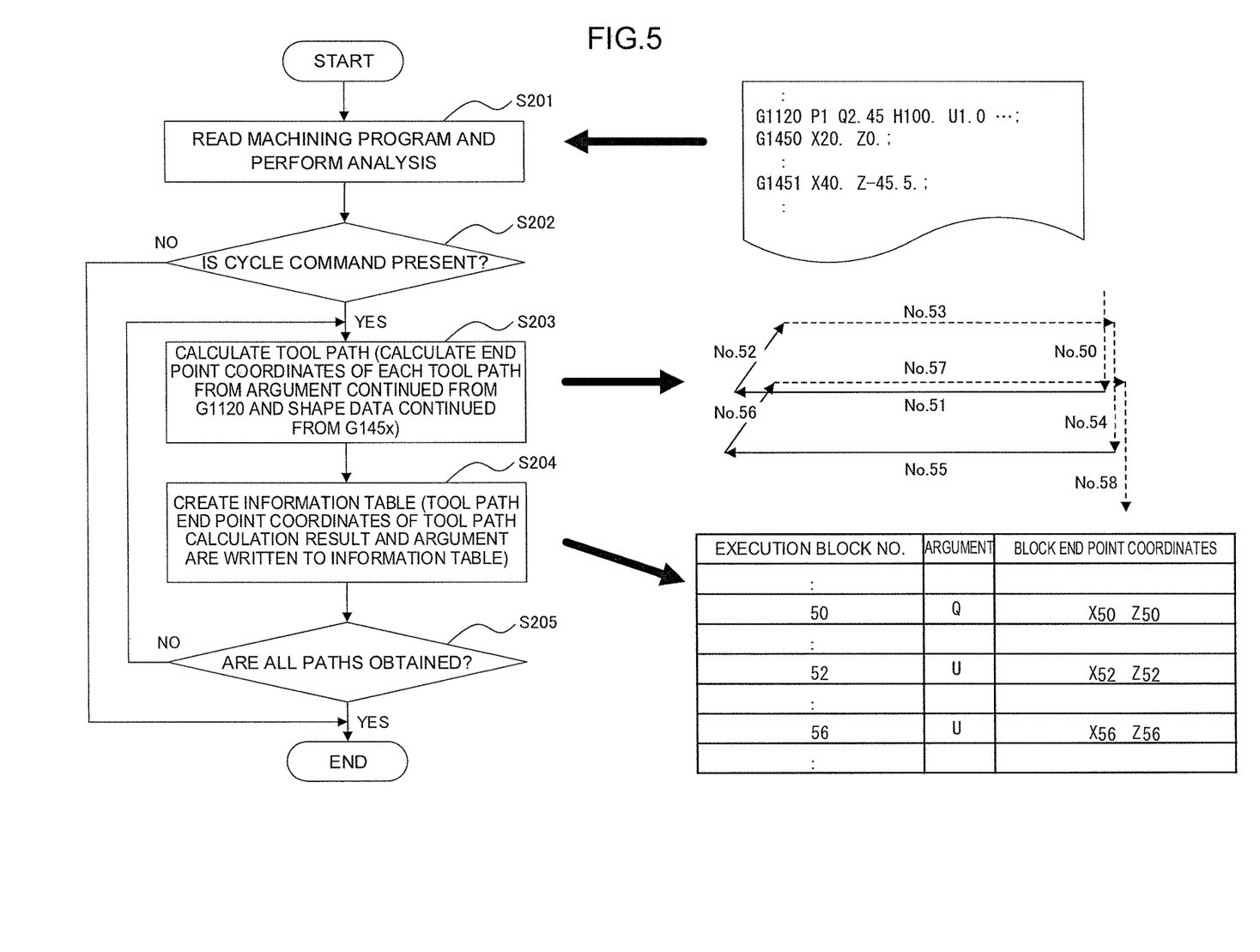
FIG. 5 is a flowchart illustrating a process of creating the information table 107.

For example, according to the machining program illustrated in FIG. 5, end point coordinates of each of the tool paths can be calculated based on an argument continued from "G1120" and shape data continued from "G145x" (x is a numerical value). In addition, a series of tool paths can be drawn by drawing a segment connecting a series of calculated end point coordinates. Herein, the tool path creation unit 103 allocates an execution block No. to each of the tool paths.

S204:

The correspondence relation management unit 105 associates the end point coordinates of the tool path, the argument of the cycle command used to determine the end point coordinates, and an execution block No. with one another, and records the point coordinates, the argument, and the execution block No. in the information table 107. For example, the information table 107 illustrated in FIG. 5 records that end point coordinates are determined by an argument "U" for a tool path, an execution block No. of which is "52", and coordinate values thereof are "$X_{52}$, $Z_{52}$".

S205:

The tool path creation unit 103 ends the process when all tool paths to be created are created based on the cycle command. On the other hand, the process continues by returning to S203 when a tool path which is not yet created is present.

Figure 6:
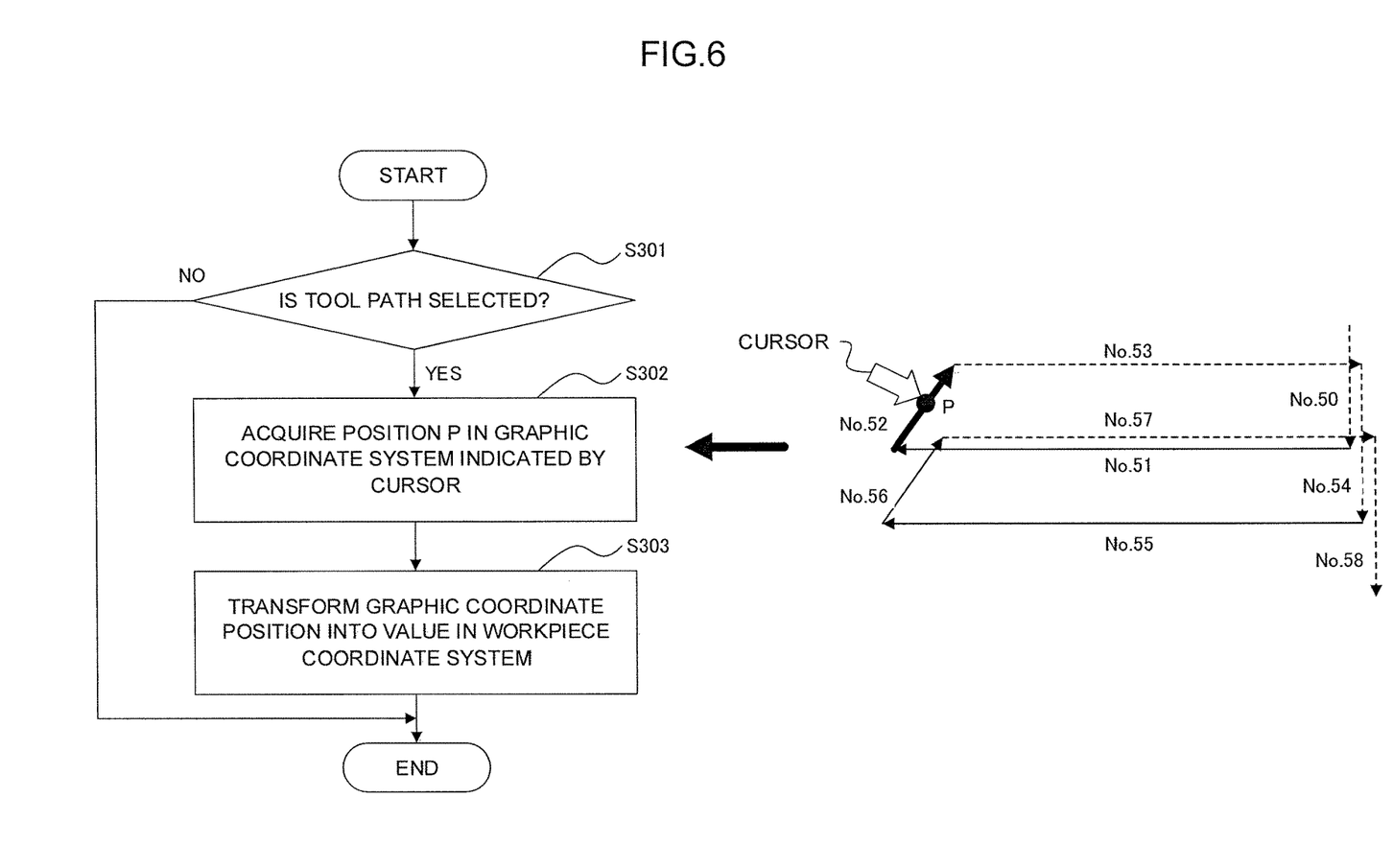
FIG. 6 is a flowchart illustrating a process of transforming coordinates.

Next, the process of transforming the coordinates of S104 to S105 will be described in more detail using FIG. 6.

S301:

When the tool path creation unit 103 detects that an indication, etc. by the pointer is performed on the screen to select one tool path on the screen, the operation proceeds to S302.

S302:

The tool path creation unit 103 acquires coordinates in the graphic coordinate system of the position P on the screen indicated by the user in S301. The graphic coordinate system refers to a coordinate system used for the numerical controller 100 to display a modeled tool path on the screen.

S303:

The tool path creation unit 103 transforms the coordinates of the position P in the graphic coordinate system into coordinate values in the workpiece coordinate system. The workpiece coordinate system refers to a coordinate system for representing a physical shape of a workpiece corresponding to a processing target of a machine tool. Typically, the tool path creation unit 103 can transform the graphic coordinate system and the workpiece coordinate system to each other using a predetermined transformation matrix.

Figure 7:
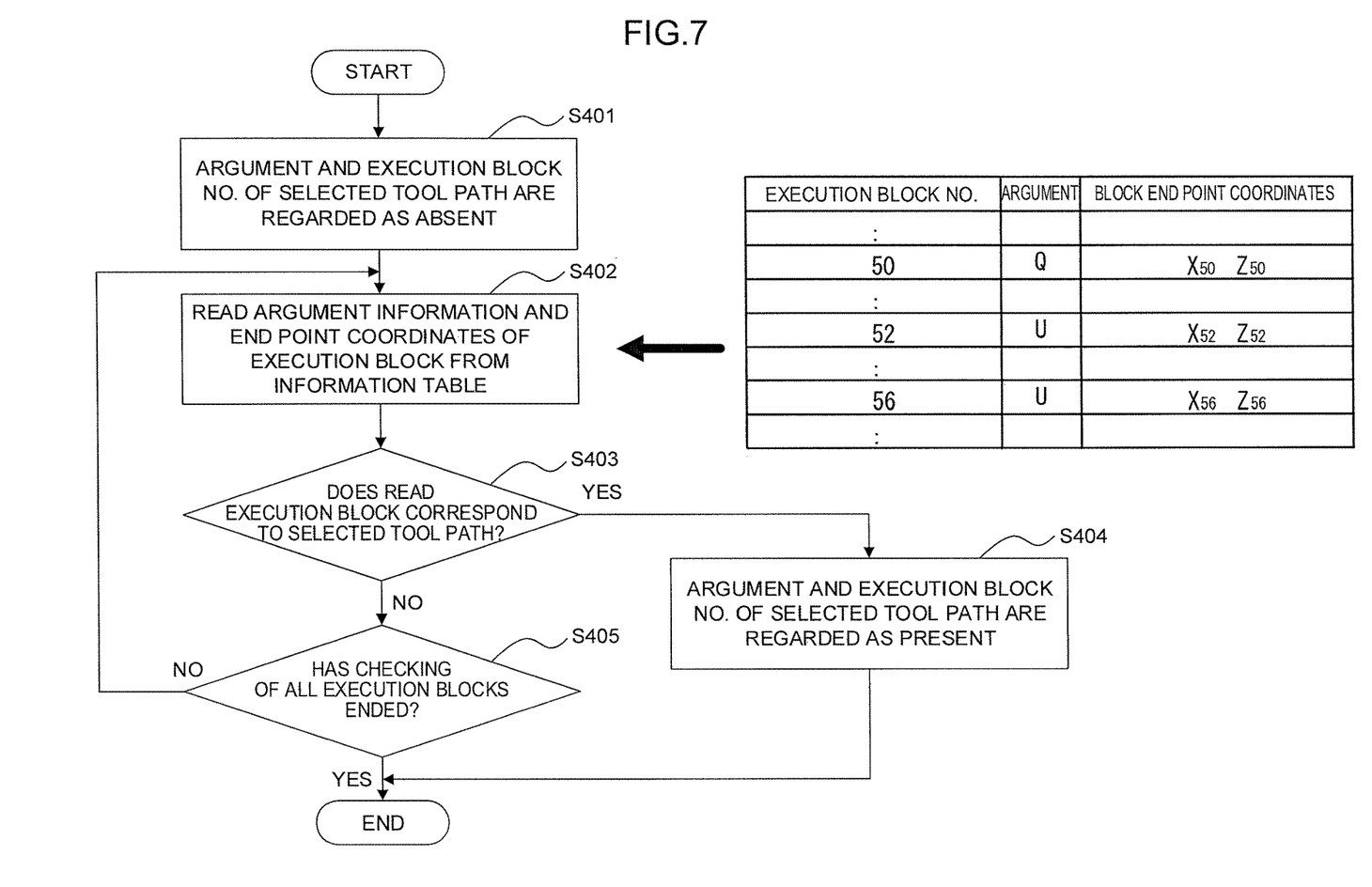
FIG. 7 is a flowchart illustrating a process of specifying an argument A.

Next, the process of specifying the argument A of S106 will be described in more detail using FIG. 7 and FIG. 3.

S401:

In an initial state, the selected tool path has not been found.

S402:

The correspondence relation management unit 105 reads one record including an execution block No., an argument, and end point coordinates with reference to the information table 107.

S403:

The correspondence relation management unit 105 evaluates a distance between the point P and a tool path of the read execution block No.

Figure 3:
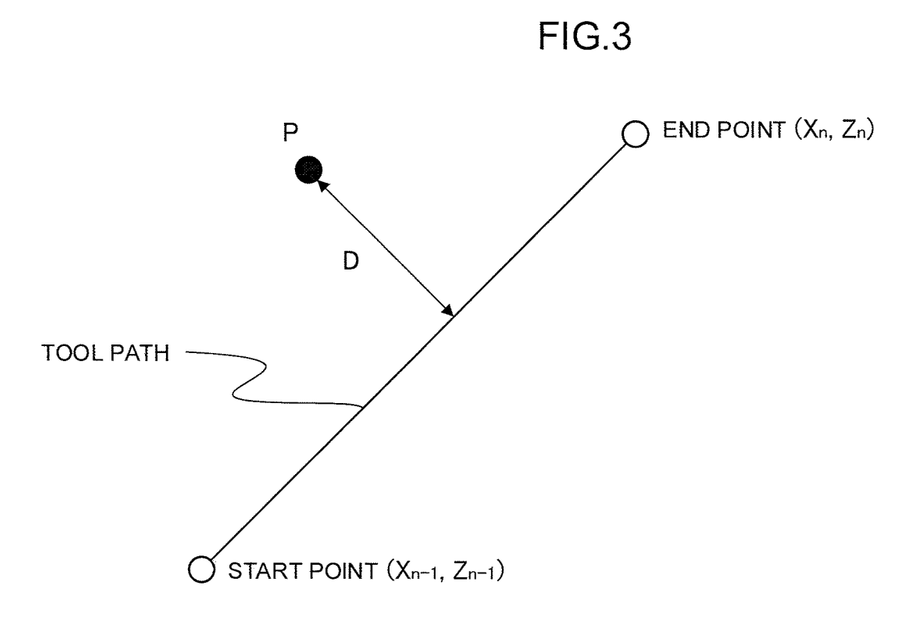
FIG. 3 is a diagram illustrating a scheme of specifying a selected tool path.

FIG. 3 is a diagram illustrating a concept of this evaluation scheme. Herein, an end point ($X_n$, $Z_n$) corresponds to the end point coordinates included in the record read in S402. A start point ($X_{n-1}$, $Z_{n-1}$) corresponds to end point coordinates included in a record read in a previous loop (processing of S402 to S405 corresponds to a loop process). A segment connecting the start point to the end point corresponds to the tool path of the execution block No.

When a distance between the point P and the tool path indicated by the segment is less than or equal to a predetermined allowable value, the correspondence relation management unit 105 determines that the user has indicated the tool path. The correspondence relation management unit 105 specifies the tool path as the selected tool path, and the operation proceeds to S404. Otherwise, the operation proceeds to S405.

S404:

The correspondence relation management unit 105 outputs the argument and the execution block No. of the selected tool path found in S403 to the machining program creation unit 101.

S405:

The correspondence relation management unit 105 determines whether reading and evaluation of all records of the information table 107 has ended. The process terminates when reading and evaluation has ended. When reading and evaluation has not ended, the operation returns to S402, and a record subsequent to the record, which is read in the previous loop, is read.

Figure 8:
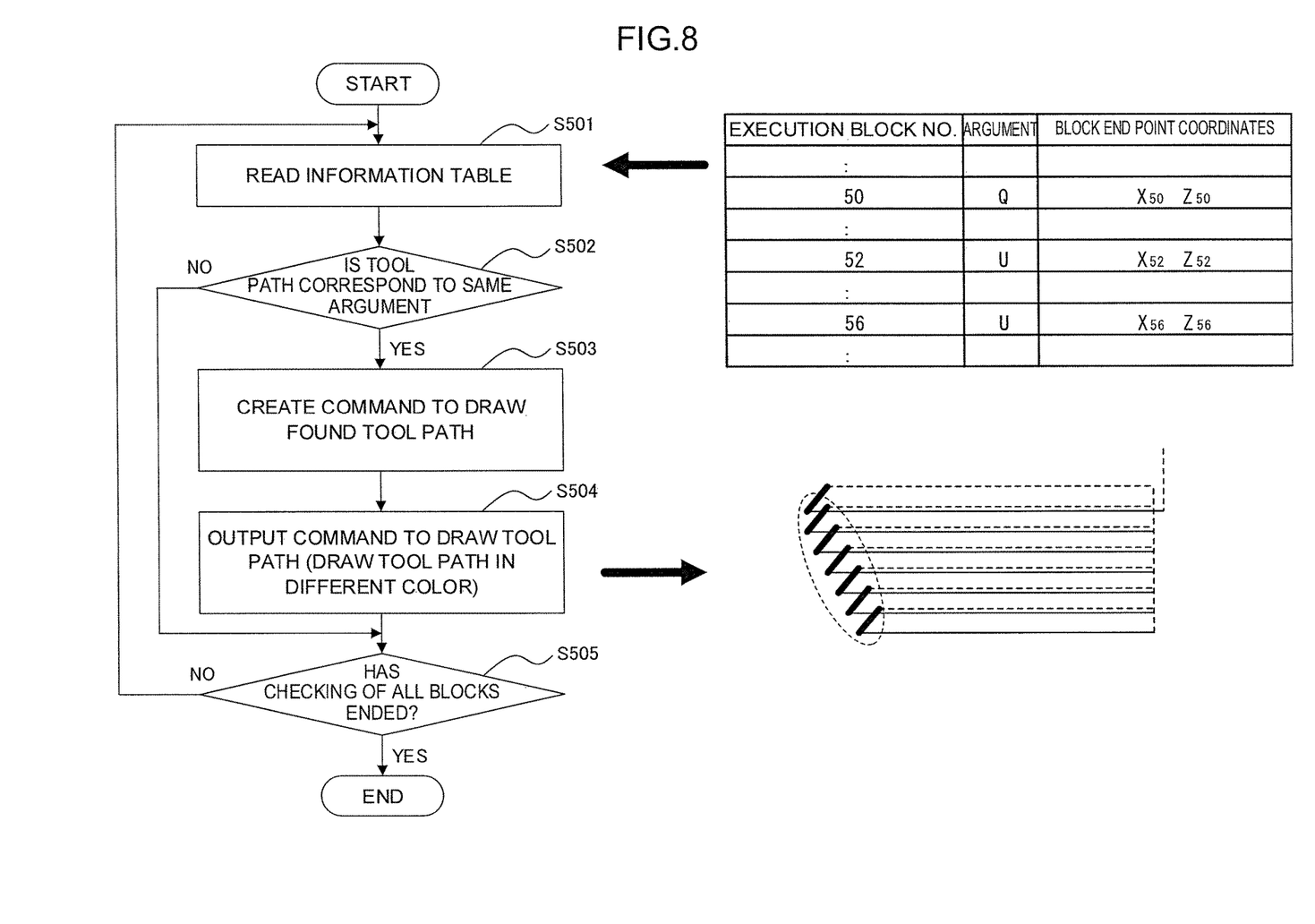
FIG. 8 is a flowchart illustrating a drawing process.

Next, the drawing process of S108 will be described in more detail using FIG. 8.

S501:

The correspondence relation management unit 105 reads one record including an execution block No., an argument, and end point coordinates with reference to the information table 107.

S502:

The correspondence relation management unit 105 determines whether the "argument" of the record read in S501 corresponds to the argument A. When the argument corresponds to the argument A, the operation proceeds to S503. When the argument does not correspond to the argument A, the operation proceeds to S505.

S503 to S504:

The tool path creation unit 103 creates a command to allow the display unit 109 to draw a tool path determined to correspond to the argument A in S502. Herein, the tool path creation unit 103 can display the tool path in a different color, thickness, etc. from that of another one.

S505:

The correspondence relation management unit 105 determines whether reading and evaluation of all records of the information table 107 has ended. The process terminates when reading and evaluation has ended. When reading and evaluation has not ended, the operation returns to S501, and a record subsequent to the record, which is read in the previous loop, is read.

According to the present Example, the numerical controller 100 displays an argument of a cycle command used to determine a tool path indicated on the screen by the user in a different form from that of another one. In this way, the user can easily identify a relation between the tool path and the argument of the cycle command.

In addition, according to the present Example, the numerical controller 100 displays another tool path related to the argument of the cycle command used to determine the tool path indicated on the screen by the user in a different form from that of another one. In this way, the user can easily identify a range of influence when the argument of the cycle command is changed.

EXAMPLE 2

When an argument of a cycle command in a machining program is selected using a cursor, a numerical controller 100 according to Example 2 displays a tool path related to the argument in a different form from that of another tool path.

Figure 9:
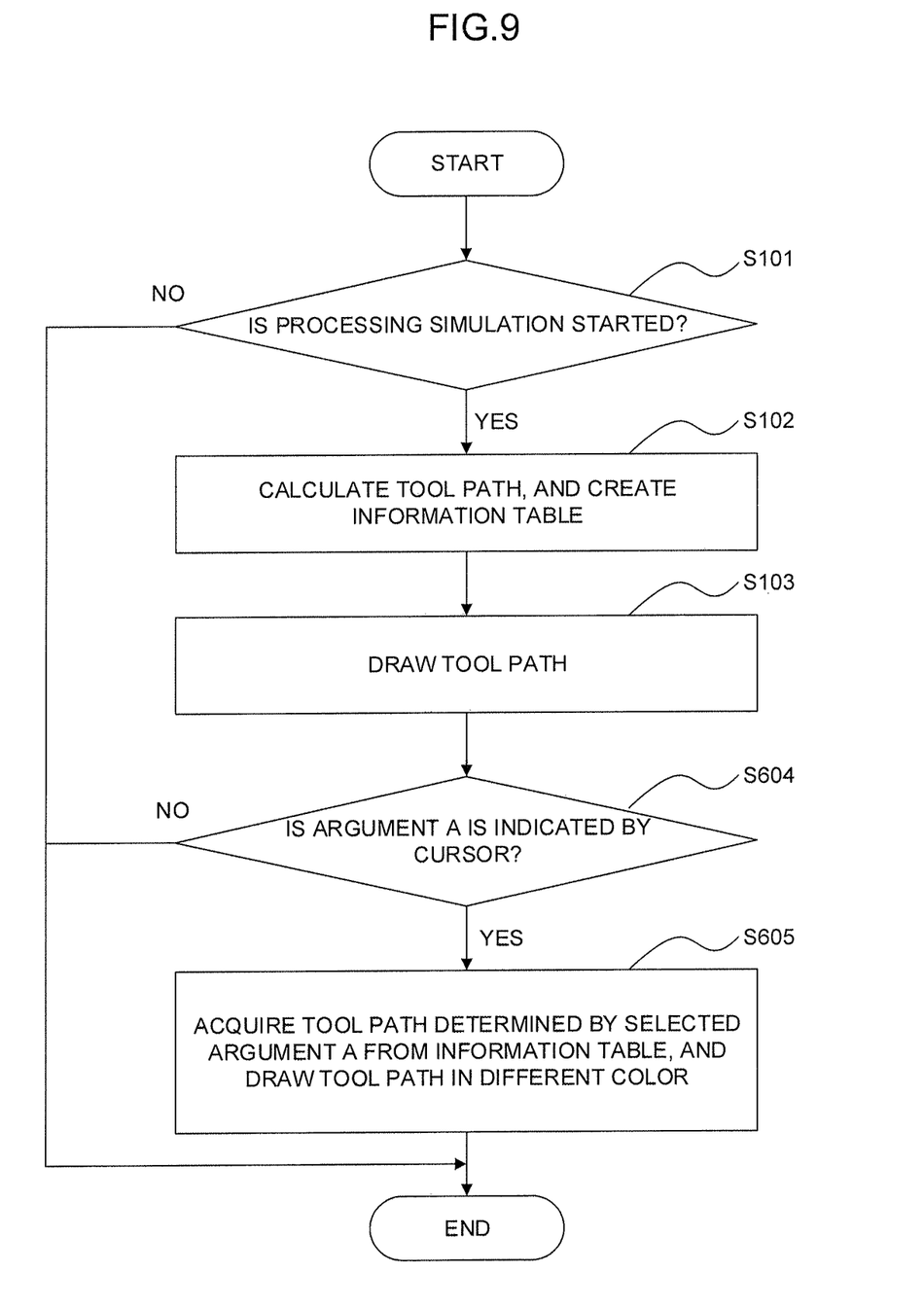
FIG. 9 is a flowchart illustrating an operation of a numerical controller 100 according to Example 2.

A description will be given of an operation of the numerical controller 100 according to Example 2 with reference to a flowchart of FIG. 9.

S101 to S103:

Similarly to Example 1, the machining program creation unit 101 receives an input of a machining program. The tool path creation unit 103 reads the machining program created by the machining program creation unit 101, and calculates a tool path. In addition, the correspondence relation management unit 105 associates the end point coordinates of the tool path, an argument of a cycle command used to determine the end point coordinates, and an execution block No. with one another, and records the point coordinates, the argument, and the execution block No. in the information table 107. The tool path creation unit 103 allows the display unit 109 to draw the calculated tool path.

S604:

The operation proceeds to S605 when the machining program creation unit 101 detects that an operation of selecting an argument in the machining program has performed on the screen. Typically, the machining program creation unit 101 detects that the user has indicated the argument A by operating the pointer displayed on the screen.

S605:

Similarly to S108 of Example 1, the correspondence relation management unit 105 extracts all tool paths related to the argument A with reference to the information table 107. That is, all records including the argument A specified in S106 are selected from the information table 107. The tool path creation unit 103 allows the display unit 109 to display a tool path extracted herein in a different display form from that of another tool path.

According to the present Example, the numerical controller 100 displays a tool path related to an argument indicated on the screen by the user in a different form from that of another one. In this way, the user can easily identify a relation between the tool path and the argument of the cycle command. In addition, the user can easily identify a range of influence when the argument of the cycle command is changed.

The invention is not restricted to the above-described embodiment, and modification such as replacement, omission, and addition of a component, changing of order, etc. may be performed within a scope not departing a subject matter. For example, Example 1 shows an example in which the numerical controller 100 performs both a process of changing the display form of the argument A corresponding to the selected tool path and a process of changing the display form of the tool path related to the argument A. However, the present embodiment is not restricted thereto, and the numerical controller 100 may perform only the process of changing the display form of the argument A corresponding to the selected tool path.

Hereinbefore, the embodiment of the invention has been described. However, the invention is not restricted to the examples of the above-described embodiment, and another mode can be implemented by appropriately making alterations.

The invention claimed is:

1. A numerical controller comprising:
    a servo motor controller for controlling a servo motor of a machine tool;
    a memory device;
    a display; and
    a processor configured to:
        receive an input of a machining program including a cycle command for controlling the machine tool,
        create a plurality of tool paths for maneuvering the machine tool based on the machining program,
        control the display to display the machining program and the plurality of toolpaths depicting a simulated operation of the tool in response to the machining program, each of the displayed plurality of tool paths are individually selectable by a user selection on the display, record a relation between an argument of the cycle command and the plurality of tool paths in an information table stored in the memory device, in response to receiving the user selection of a selected tool path corresponding to one of the plurality of displayed tool paths displayed on the display:

specify an argument of the cycle command corresponding to the selected tool path with reference to the information table, and control the display to display the specified argument in a highlighted form that is different from a form of another argument displayed in the machining program, and in response to a user selection to execute the machine program, controlling the servo motor controller to maneuver the machine tool along the tool paths.

2. The numerical controller according to claim 1, wherein the processor is further configured to specify all tool paths corresponding to the specified argument with reference to the information table, and control the display to display the specified tool paths among the plurality of tool paths in a different form from a form of another tool path.

3. A numerical controller comprising:
a servo motor controller for controlling a servo motor of a machine tool;
a memory device;
a display; and
a processor configured to:
receive an input of a machining program including a cycle command for controlling the machine tool, the cycle command including a plurality of arguments, create a plurality of tool paths for maneuvering the machine tool based on the machining program, control the display to display the machining program including the plurality of arguments and the plurality of tool paths depicting a simulated operation of the tool in response to the machining program, each of the displayed plurality of arguments are individually selectable by a user selection on the display, record a relation between the plurality of arguments of the cycle command and the plurality of tool paths in an information table stored in the memory device, in response to receiving the user selection of an argument of the plurality of arguments of the cycle command displayed on the display:

specify all tool paths corresponding to the selected argument with reference to the information table, and control the display to display the specified tool paths among the plurality of tool paths in a different form from a form of another tool path, and in response to a user selection to execute the machine program, controlling the servo motor controller to maneuver the machine tool along the tool paths.

* * * * *